United States Patent [19]
Lopez

[11] 3,741,162
[45] June 26, 1973

[54] AUTOMATIC ANIMAL FEEDING MACHINE

[76] Inventor: Antonio R. Lopez, 6050 Garden Dale Street, South Gate, Calif.

[22] Filed: Sept. 25, 1970

[21] Appl. No.: 75,376

[52] U.S. Cl............................. 119/51.13, 119/51.5
[51] Int. Cl............................................ A01k 5/02
[58] Field of Search................... 119/51.13, 51.11, 119/51, 51.5

[56] References Cited
UNITED STATES PATENTS

| | | | |
|---|---|---|---|
| 3,340,851 | 9/1967 | Frank et al. | 119/51.13 |
| 2,500,243 | 3/1950 | Dixon | 119/51.13 |
| 3,119,526 | 1/1964 | Sutton | 119/51.11 X |
| 3,196,835 | 7/1965 | Bergevin | 119/51.11 |

*Primary Examiner*—Hugh R. Chamblee
*Attorney*—Ronald L. Juniper

[57] ABSTRACT

A feeding machine for animals comprising a rotatable bin for feed having separated compartments which can be selectively rotated by an automatic timing mechanism to release feed and, optionally, water into a feeding chute.

8 Claims, 7 Drawing Figures

PATENTED JUN 26 1973 3,741,162

INVENTOR.
TONY R. LOPEZ
By Ronald L. Juniper
ATTORNEY.

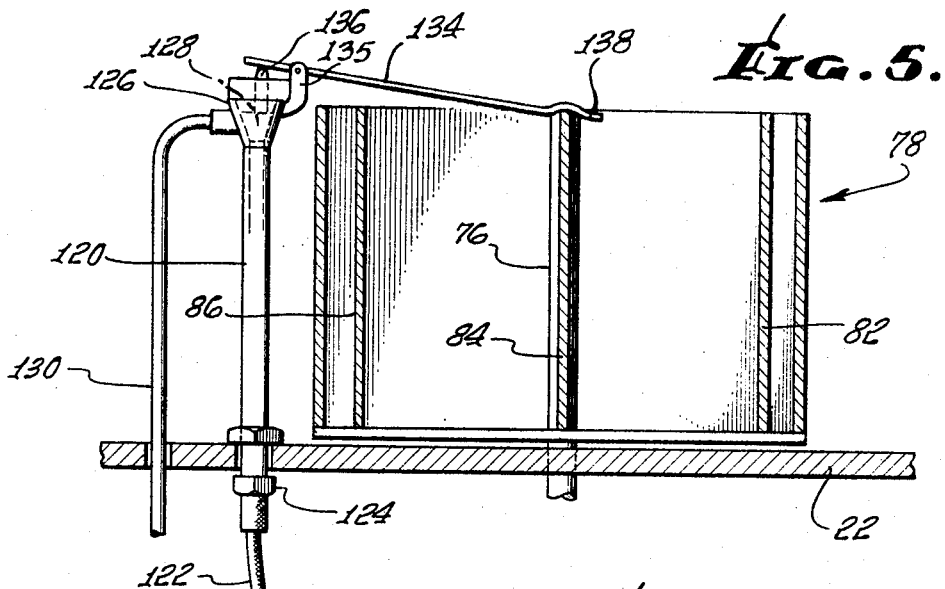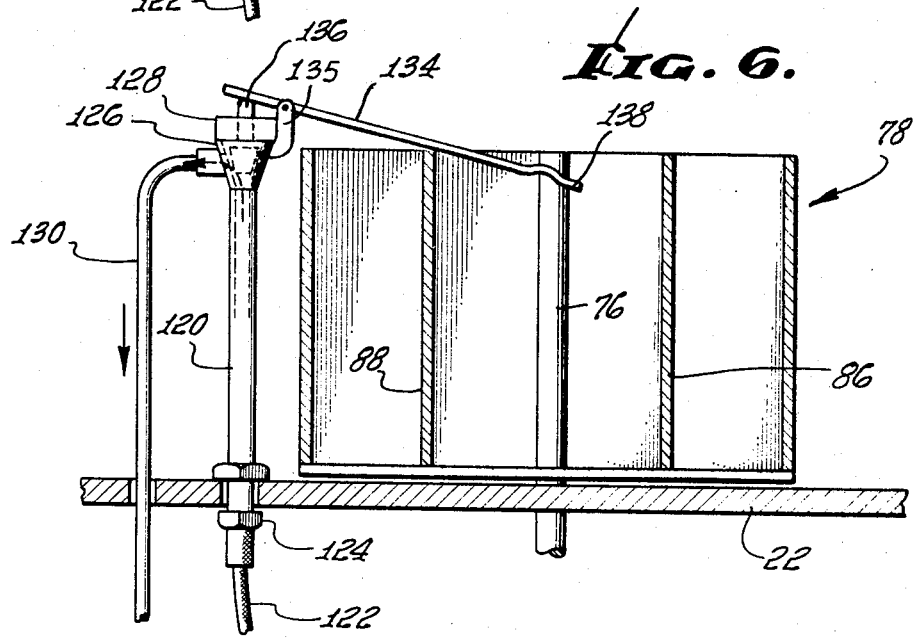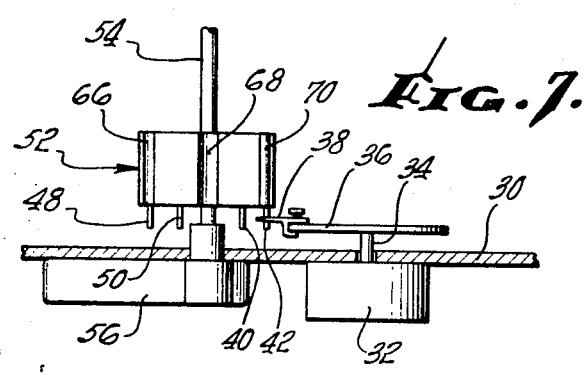

3,741,162

AUTOMATIC ANIMAL FEEDING MACHINE

BACKGROUND OF THE INVENTION

Often it is necessary for owners of animals to be away from the places where the animals are kept for days at a time. During such times feeding the animals can be a problem since finding someone to care for them is not always easy. Hence, there is a need for a machine to feed animals at pre-selected periods of time automatically to alleviate this problem. Since economy and reliability are important qualities, the apparatus should not be unduly complicated and should incorporate relatively rugged component parts. It is the primary object of this invention to achieve these results and other advantages which will be apparent from the following illustrative description.

BRIEF DESCRIPTION OF THE DRAWINGS

FIG. 5 is a sectional view of the water release system taken through 5 — 5 in FIG. 4.

FIG. 6 is a view of the water release system as in FIG. 5 wherein the lever is dropped to actuate water release.

FIG. 7 is a view of the timer mechanism taken through 7 — 7 in FIG. 4.

DETAILED DESCRIPTION OF THE INVENTION

Figure 1:
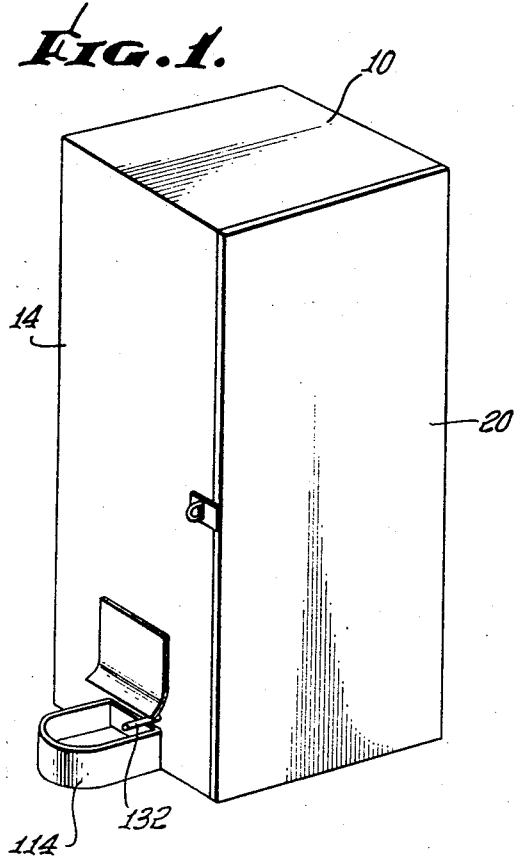
FIG. 1 is a perspective view of the exterior of this invention.
Figure 2:
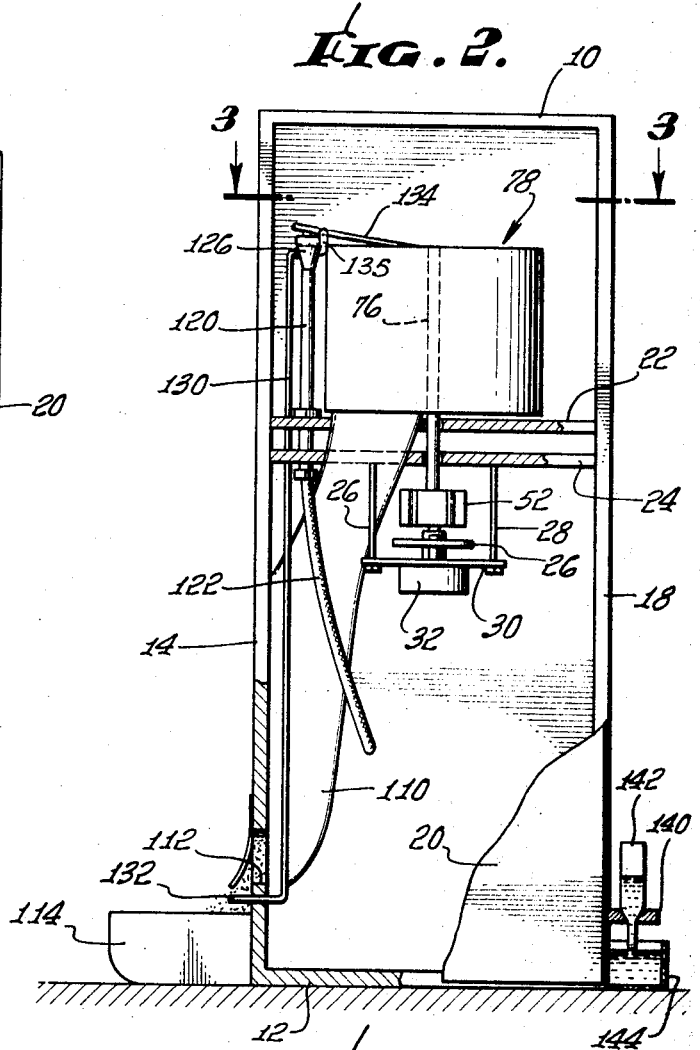
FIG. 2 is a vertical cross-sectional view of the interior of the invention.
Figure 4:
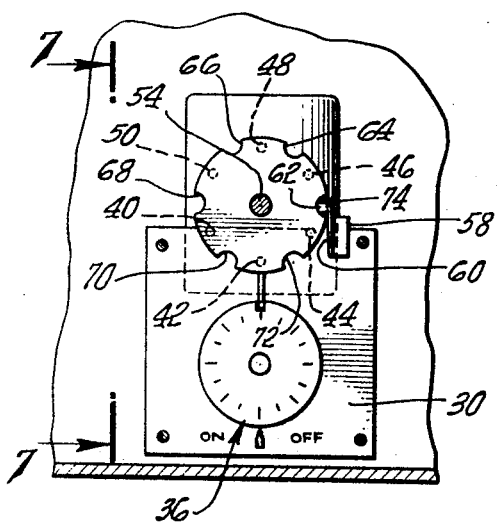
FIG. 4 is a top plane view of the timer mechanism portion of the invention.
Figure 3:
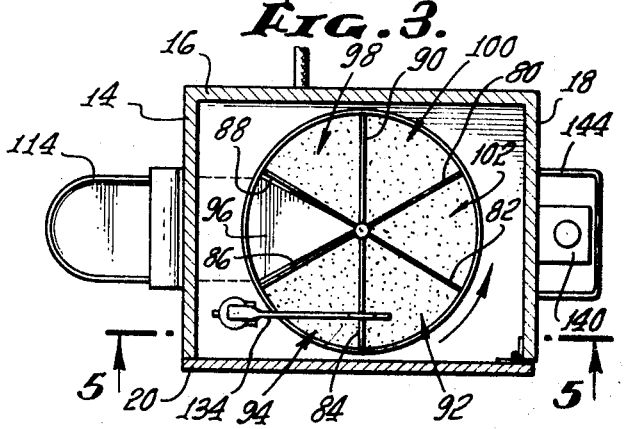
FIG. 3 is a sectional view of the invention taken through 3 — 3 in FIG. 2.

An embodiment of this invention as shown in the drawings includes a supporting structure which includes a normally horizontal rectangular top plate 10 and bottom plate 12 interconnected by three vertical walls 14, 16 and 18 to three adjacent sides of each of plates 10 and 12 and a vertical door 20 connected by hinges to the open edge of wall 18 and closing adjacent to the open edge of wall 14. Supported intermediate the top and bottom plates 10 and 12 and attached to the vertical walls are closely spaced horizontal shelves 22 and 24 mounted within the supporting structure which, as viewed here, takes the form of an enclosed upright cabinet.

Suspended from the bottom central portion of the lower shelf 24 by spaced bolts 26 and 28 is a horizontal platform 30 used to support the timer mechanism to be described hereinafter.

Attached beneath platform 30 is a timer motor 32 which is engaged to rotate a central axle 34 that protrudes through a complementary hole in platform 30 to rotate a circular timer plate 36 centrally affixed to axle 34 and mounted above platform 30. The timer plate 36 includes equally spaced circumferential marks around its outside edge which, preferably, can serve as a 24-hour clock when the timer motor 32 is set to rotate plate 36 once each 24 hours.

Extending out from a portion of the circumferential periphery of timer plate 36 is a tripper pin 38. This pin 38 is so positioned that as plate 36 rotates it will from time to time engage one of the trippers which takes the form of small rods 40, 42, 44, 46, 48 and 50 extending down from a rotatable cam 52. The cam 52 is mounted for rotation on an axle 54 which is, in turn, connected to and driven by a selectively actuated motor 56 mounted beneath horizontal platform 30.

This motor 56 is turned "off" and "on" (so as to rotate the cam 52) by a microswitch 58 which includes a spring-tensioned movable actuating lever arm 60 having a rounded switch button 62 on its free end. This lever arm 60 is so positioned relative to cam 52 that its switch button 62 resiliently presses against the periphery of cam 52 and turns the cam motor 56 "on" when it presses against the normal peripheral portions of cam 52 but turns the cam motor 56 "off" when switch button 62 drops into one of the series of spaced concave pockets 62, 64, 66, 68, 70, and 72 formed in the circumferential peripheral surface of cam 52.

In the form shown this coordination of the on - off switch actuation of cam motor 56 is achieved by forming the cam 52 as a generally cylindrical element that has a peripheral outward surface that is circular and indented by the concave pockets 62, 64, 66, 68, 70 and 72 spaced at regular intervals thereon. The axis of axle 54, in turn, is aligned perpendicular to the plane of the movement of lever arm 60 so that when the switch button 62 on the end thereof drops down into one of the concave pockets it turns the cam motor 56 off thereby stopping rotation by motor 56 of the cam 52 and its connected axle 54. Then, after the elapse of a preselected amount of time controlled by timer motor 32, the extending tripper pin 38 on the connected timer plate 36 will turn to push the nearest one of the small rods 40, 42, 44, 46, 48 or 50 (which extend down from equally spaced locations adjacent to the circumferential periphery of cam 52). Each of these rods are mounted between a pair of the spaced concave pockets on the periphery of cam 52 so that when pushed by tripper pin 38, the cam 54 will be turned on its axis 54 just enough to cause the switch button 62 to slide out of the concave pocket in which it is resting and up onto the adjacent portion of the peripheral surface of cam 54.

This, in turn, will move the actuating lever arm 60 so that it turns "on" the microswitch 58 and also the cam motor 56 so as to rotate the cam axle 54 and cam 52 until the switch button 62 on the actuating lever arm 60 again drops down into the next concave pocket in the circumferential peripheral surface of cam 52 thereby turning microswitch 58 and the associated mechanisms "off". This process is continually repeated at the timed intervals preselected on the timing mechanism previously described.

The cam axle 54 extends upwardly from the cam 52 through mating holes in the lower horizontal shelf 24 and the upper horizontal shelf 22 to provide a central axle portion 76 for the rotatable feed bin 78. This feed bin 78 in the embodiment of this invention shown here is cylindrical in form and constructed to include a number of compartments (six as shown here) separated from each other by the radiating, equally angled vertical feed bin section walls 80, 82, 84, 86, 88 and 90 which each extend from the central axle portion 76 outwardly to join with the interior of the circular wall of feed bin 78 so as to form six pie-shaped feed compartments 92, 94, 96, 98 100 and 102.

Both the top and bottom of these feed compartments is open so that they can be loaded with feed through the top and emptied through the bottom. However, the bottom of all the feed compartments is normally closed because the bottom of the feed bin 78 is positioned immediately above the top surface of upper shelf 22 with just enough separation to allow rotation without binding. The shelf 22 in turn is solid so as to form a closing means for all of the compartments except one. The one compartment which is not provided with the bottom closing means cooperation of shelf 22 is positioned over an opening (preferably pie-shaped like the compartments) in the upper shelf 22, which opens into a feed chute 110 which extends down through an opening through the lower shelf 24 and terminates at a feed outlet 112 through the bottom of the cabinet vertical wall 14 placed just above a feed pan 114 attached thereto.

The vertical feed bin section walls are attached to the central axle portion 76 relative to the concave pockets on cam 52 in such a way that when switch button 62 is stopped within one of said concave pockets, one of the feed compartments is directly positioned over the opening through upper shelf 22 into the feed chute 110 to thereby unload its contents down the chute. Then, when the tripper pin 38 is moved by the rotation of timer plate 36 to engage one of the small rods extending down from cam 52 so as to start it rotating enough to slide the switch button 62 out of a concave pocket thereby turning the microswitch 58 and cam motor 56 "on" to cause the feed bin 78, in turn, to rotate as previously described.

In order to provide wet feed for the animal using this device an automatically actuated water release system may be provided as best shown in FIGS. 5 and 6. This includes a vertical water inlet pipe 120 and associated inlet receiving hose 122 (connected to a source of water, not shown) attached thereto by a fitting 124 mounted in and through holes in the upper horizontal shelf 22 and the lower horizontal shelf 24.

The water inlet pipe 120 extends up to a terminal top position near the top edge of feed bin 78 where it is formed as a funnel shaped valve seat 126 providing internal seating for a spring-actuated check valve 128. This valve 128 can selectively block the flow of water therethrough to an interconnected water outlet line 130 which extends vertically therefrom down along the inside of wall 14 of the cabinet and through suitable openings in shelves 22 and 24 to terminate after passing through another suitable opening in wall 14 slightly above feed pan 114 through a short horizontal outlet pipe 132.

The actuation of the check valve 128 is controlled by a lever arm 134 pivotally connected to a pivot support 135 and mounted to press down on a top portion 136 of valve 128. The free end 138 of arm 134 rests on the top of feed bin 78 and is so positioned that it is moved up and down to open and close valve 128 and to thereby control the passage of water therethrough. The check valve 128 and associated pivotally mounted lever arm 134 can be the mechanism conventionally used for flushing a toilet such as the American Standard Brand without a bulb float on the end of arm 134.

The positioning of lever arm 134 is such that it is coordinated to have its free end 138 rest on the top edge of one of the vertical feed bin section walls 80, 82, 84, 86, 88 and 90 to close the valve 128 when the feed bin compartment over the feed chute 110 has emptied. Then when the feed bin 78 is actuated by the timing mechanism previously described to rotate so as to empty another feed bin compartment, the free end 138 of arm 134 drops down (as best viewed in FIG. 6) to open valve 128. This allows water to flow through the inlet pipe 120 into the outlet line 130 to wet the feed as it slides down the feed chute 110 by pouring through the horizontal outlet pipe 132 into feed pan 114.

To provide drinking water for the animal a bottle holder 140 having a hole therein suitable for holding a water bottle 142 above, a water pan 144 is attached (as shown in FIG. 6) to the lower portion of vertical wall 18 of the cabinet. The bottle 142 is filled with drinking water and then inverted and placed in the holder 142 so that the outlet of the bottle extends into the water pan 144 to provide a gravity controlled regular water supply which fills the pan 144 as the animal drinks. That is, as long as water remains in the bottle 142 it will flow down into the pan 144 to maintain a constant water level in the pan. Thus, a complete automatically controlled and timed unit is provided for caring for the animal's needs while its owner is away from home.

Though a particular form of this invention has been described in detail herein for illustrative purposes it is not intended that this invention be limited to all the specific details therein but is is meant to comprehend variations and modifications within the spirit and scope of the following appended claims.

I claim:

1. An automatic feeding machine for animals comprising a supporting structure, a rotatable feed bin mounted within said supporting structure, said feed bin having vertically sectioned separate open-bottomed compartments, a feed chute mounted within said supporting structure beneath one of said compartments and extending down therefrom exterior of said structure to an outlet to provide a means for releasing feed contained in said feed bin, a closing means member cooperating with said feed bin so as to close the open bottom of the compartments thereof except the one positioned over the feed chute, drive means interconnected to said feed bin adapted to rotate it so that each of its separate compartments can be selectively moved to open over said feed chute and release feed contained therein, an automatic control means interconnected to said drive means to selectively actuate rotation of said feed bin at predetermined times, said automatic control means comprising a rotatable cam having a series of spaced concave pockets on its peripheral surface, an axle interconnecting said feed bin, said drive means and said rotatable cam, a timer clock including a rotatable timer plate having a tripper pin extending out from a peripheral portion thereof positioned so as to engage and turn said rotatable cam at preselected intervals, a switch for actuating said drive means including an on - off button engaging the periphery of said rotatable cam operated by contacting the selectively spaced concave pockets thereon as it is selectively rotated said drive means actuated to turn said feed bin to release feed from a compartment therein by a selected time interval controlled by said timer clock so that the tripper pin engages and turns said rotatable cam enough to cause the switch on-off button to slide out of the concave pocket onto the adjacent peripheral surface to turn the drive means on and continue to rotate said axle, feed bin, and rotatable cam until said switch button slides into the next adjacent concave pocket on the surface of said cam when the switch is thereby turned off.

2. An automatic feeding machine as defined in claim 1 which includes an inlet hose for providing water which is connected to a source of water, an outlet hose interconnected to said inlet hose through a check valve, said outlet hose positioned to open adjacent to said feed chute to supply water to feed released therefrom, and an actuating arm connected to said check valve so positioned that it bears against the vertically sectioned compartments of said feed bin and opens said check valve to allow water flow as the feed is released and to close it after the feed has been released from one of said feed bin compartments.

3. An automatic feeding machine as defined in claim 2 which includes a drinking water dispenser comprising a bottle holder attached to said supporting structure, a water pan positioned below said bottle holder and a bottle mounted upside down in said bottle holder positioned so that its neck extends into said water pan so that when filled with water it is automatically dispensed by gravity to level within said pan.

4. An automatic feeding machine comprising a supporting structure, a rotatable feed bin mounted within said supporting structure, said feed bin having vertically sectioned separate open-bottomed compartments, a feed chute mounted within said supporting structure beneath said feed bin and extending down therefrom exterior of said structure to an outlet, so as to provide a means for releasing feed contained in said feed bin, closing means cooperating with said feed bin so as to close the bottom portion of each of said feed bin compartments except one positioned over the said feed chute which is open to release feed, drive means interconnected to said feed bin to rotate it so that each of its separate compartments can be selectively moved to open over said feed chute and release feed contained therein, automatic control means interconnected to said drive means to selectively actuate said rotation of said feed bin at predetermined times, said automatic control means including a clock, a rotatably mounted timer member adjacent to said clock having spaced contact elements on its periphery equal to the number of compartments in the feed bin, a tripper pin extending from said clock and movable to engage one of said contact elements at preselected times and to move said rotatably mounted timer member, a switch interconnected to said timer member and to the drive means which turns it on and off.

5. An automatic feeding machine as defined in claim 4 wherein the rotatably mounted timer has a cam surface provided with a series of spaced concave pockets in its rotated periphery, said switch resiliently presses against said cam surface and periodically drops into said concave pockets to turn it on and off as said cam element is rotated.

6. An automatic feeding machine as defined in claim 5 wherein, when the tripper pin extending from said clock engages one of said contact elements of said timer member, said timer member is rotated sufficiently thereby to cause said switch to be moved out of a concave pocket to the adjacent cam surface to turn the switch and connected motor "on" so as to continue rotating the timer member until said switch drops into the next adjacent concave pocket wherein the switch is turned "off".

7. An automatic feeding machine as defined in claim 6 which includes an inlet hose for providing water which is connected to a source of water, an outlet hose interconnected to said inlet hose through a check valve, said outlet hose positioned to open adjacent to said feed chute to supply water to feed released therefrom, and an actuating arm connected to said check valve so positioned that it bears against the vertically sectioned compartments of said feed bin and opens said check valve to allow water flow as the feed is released and to close it after the feed has been released from one of said feed bin compartments.

8. An automatic feeding machine as defined in claim 4 which includes a drinking water dispenser comprising a bottle holder attached to said supporting structure, a water pan positioned below said bottle holder and a bottle mounted upside down in said bottle holder positioned so that its neck extends into said water pan so that when filled with water it is automatically dispensed by gravity to level within said pan.

* * * * *